(12) United States Patent
Perez et al.

(10) Patent No.: US 6,432,527 B1
(45) Date of Patent: Aug. 13, 2002

(54) EMBOSSED FILM HAVING CONTROLLED TEAR

(75) Inventors: Mario A. Perez, Burnsville; Michael D. Swan, Maplewood, both of MN (US); Robert J. Maki, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/461,118

(22) Filed: Dec. 14, 1999

(51) Int. Cl.[7] .............................................. B32B 15/04
(52) U.S. Cl. ..................................................... 428/343
(58) Field of Search ......................................... 428/343

(56) References Cited

U.S. PATENT DOCUMENTS

| | | | |
|---|---|---|---|
| 2,532,011 A | 11/1950 | Dahlquist et al. | 154/53.5 |
| 2,607,711 A | 8/1952 | Hendricks | 117/122 |
| 3,318,852 A | 5/1967 | Dixon | 260/78.5 |
| 3,396,837 A | 8/1968 | Schmelzle et al. | 206/59 |
| 3,491,877 A | 1/1970 | Viker et al. | 206/59 |
| 3,502,497 A | 3/1970 | Crocker | 117/68.5 |
| 4,139,669 A | 2/1979 | Chang | 428/167 |
| 4,237,889 A | 12/1980 | Gobran | 128/287 |
| 4,241,198 A | 12/1980 | Kobayashi | 525/360 |
| 4,358,494 A | 11/1982 | Akimoto et al. | 428/40 |
| 4,524,087 A | 6/1985 | Engel | 427/2 |
| 4,728,571 A | 3/1988 | Clemens et al. | 428/352 |
| 4,781,957 A | 11/1988 | Brown et al. | 428/43 |
| 4,808,474 A | 2/1989 | Sipinen | 428/343 |
| 4,817,816 A | 4/1989 | Leseman et al. | 220/359 |
| 4,992,331 A | 2/1991 | DeCoste, Jr. | 428/354 |
| 5,032,460 A | 7/1991 | Kentner et al. | 428/449 |
| 5,079,066 A | 1/1992 | Leseman et al. | 428/167 |
| 5,202,190 A | 4/1993 | Kantner et al. | 428/447 |
| 5,214,119 A | 5/1993 | Leir et al. | 528/28 |
| 5,290,615 A | 3/1994 | Tushaus et al. | 428/40 |
| 5,308,668 A | 5/1994 | Tsuji | 428/43 |
| 5,356,706 A | 10/1994 | Shores | 428/352 |
| 5,512,650 A | 4/1996 | Leir et al. | 528/14 |
| 5,631,073 A | 5/1997 | Riedel et al. | 442/364 |
| 5,733,570 A | 3/1998 | Chen et al. | 424/445 |
| 5,750,630 A | 5/1998 | Sengupta | 528/59 |
| 5,795,834 A | 8/1998 | Deeb et al. | 442/62 |

FOREIGN PATENT DOCUMENTS

| | | |
|---|---|---|
| EP | 0 022 664 | 1/1984 |
| EP | 0 255 866 | 2/1988 |
| EP | 0 459 059 | 7/1994 |
| EP | 0 705 894 | 10/1996 |
| GB | 1130395 | 10/1968 |
| JP | 49051330 | 5/1974 |
| JP | 08048951 | 2/1996 |
| JP | 9-66070 | 3/1997 |
| WO | WO 94/25251 | 11/1994 |
| WO | WO 95/20633 | 8/1995 |
| WO | WO 99/16608 | 4/1999 |
| WO | WO 99/20664 | 4/1999 |

OTHER PUBLICATIONS

McCrum et al., "Principles of Polymer Engineering", Oxfom University Press, New York, Tokyo (1988), pp. 167–172.

Primary Examiner—Terressa M. Boykin
(74) Attorney, Agent, or Firm—Kent S. Kokko

(57) ABSTRACT

This invention relates to an oriented embossed film, which may be used as a backing in an adhesive tape. The film is easily and readily hand-tearable without the use of cutting tools or a dispenser and provides a substantially straight, non-curling edge when torn.

32 Claims, 3 Drawing Sheets

EMBOSSED FILM HAVING CONTROLLED TEAR

BACKGROUND

This invention relates to an oriented, embossed film, which may be used as a backing in an adhesive tape. The film is easily and readily hand-tearable without the use of cutting tools or a dispenser and provides a substantially straight, non-curling edge when torn.

Many adhesive tapes, particularly those used for packaging and sealing require backings having relatively high tensile strengths. For this reason, various types of Kraft paper, plastic films and cloths that have considerable tensile strength have been used in the construction of adhesive tapes. Thus to remove a length of tape from a roll, an auxiliary cutting tool or surface is often required, making a taping process less convenient.

Many adhesive tapes have a longitudinally oriented film backing. The orientation of the film backing significantly improves the tensile strength of the tape, but renders it extremely difficult to hand tear a length of tape cleanly and transversely. Such oriented films tend to stretch unduly, not conform well, and tear along the axis of orientation.

Many tapes use paper treated with moisture-resistant polymer as a backing. Paper is a surprisingly expensive material, and its cost is increased by the several treatments to which it is subjected in making the tape suitable for many uses. Further, even treated paper retains a moisture-sensitivity that occasionally weakens it sufficiently to cause it to fail. Also, paper is comparatively stiff so that the tape does not flex or conform well to many surfaces.

Cloth-backed tapes can be more attractive, flexible, and tear-resistant than paper but cloth is expensive, special treatments are required to prevent the penetration of adhesive through it, and there is a tendency for it to ravel. Various types of nonwoven tape backings, including the so-called "spun-bonded" polymeric backings are less expensive to make and more ravel-resistant than woven cloth, but their thickness, tear-resistance, etc., are not uniform and their open nature makes application of adhesive coating difficult and expensive.

SUMMARY

The present invention provides a film that is inexpensive to manufacture, uses readily available materials which may be processed using conventional equipment, and is tearable (capable of being torn) in the cross-web (transverse) direction and optionally in the longitudinal (machine) direction. The film, when used as a backing for adhesive tapes, possesses good mechanical properties, such as tensile strength, low stretch or creep, and a reduced tendency to inadvertently split along the direction of orientation. The tape is suitable in medical, industrial and commercial applications.

Thus, the present invention provides an embossed, uniaxially oriented film comprising a major amount of a semicrystalline first polymer component, a minor amount of a second polymer component having a yield point less than that of the first polymer component, and an embossed pattern providing predetermined tearability in a direction substantially transverse to the direction of orientation. Preferably the film comprises a continuous phase of the first polymer component and a discontinuous phase of the second polymer component.

The present invention also provides an adhesive article comprising the embossed, uniaxially oriented film and a layer of adhesive on at least one major surface of the film. The adhesive layer may be coated on the embossed (patterned) or unembossed (smooth) surface of the film. Preferably the adhesive layer is on the embossed (patterned) surface and preferably the adhesive is a pressure-sensitive adhesive.

Further, the present invention provides a process for preparing an embossed, oriented film that comprises providing a film comprising a melt-processed polymer blend comprising a semicrystalline first polymer component and a second polymer component having a yield point less than the first polymer component, orienting the film, and embossing the oriented film with a pattern to impart tearability in a direction substantially transverse to the direction of orientation. Optionally a pattern may be chosen that will impart tearability in the longitudinal direction as well.

DETAILED DESCRIPTION

Figure 1:
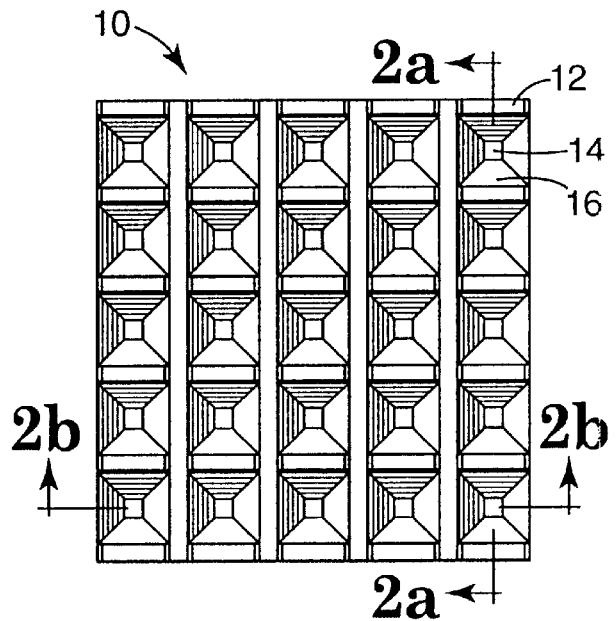
FIGS. 1 to 6 illustrate several useful embossing patterns and tape constructions of the present invention.

Polymers useful in the present invention as the first polymer component include any melt-processible crystalline, semicrystalline or crystallizable polymers or copolymers and blends thereof Semicrystalline polymers consist of a mixture of amorphous regions and crystalline regions. The crystalline regions are more ordered and segments of the chains actually pack in crystalline lattices. Some crystalline regions may be more ordered than others. If crystalline regions are heated above the melting temperature of the polymer, the molecules become less ordered or more random. If cooled rapidly, this less ordered feature is "frozen" in place and the resulting polymer is said to be amorphous. If cooled slowly, these molecules can repack to form crystalline regions and the polymer is said to be semicrystalline. Some polymers are always amorphous and show no tendency to crystallize. Some polymers can be made semicrystalline by heat treatments, stretching or orienting and by solvent inducement, and these processes can control the degree of true crystallinity.

Semicrystalline polymers useful in the present invention include, but are not limited to, high and low density polyethylene, polypropylene, polyoxymethylene, poly (vinylidine fluoride), poly(methyl pentene), poly(ethylene-chlorotrifluoroethylene, poly(vinyl fluoride), poly(ethylene oxide), poly(ethylene terephthalate), poly(butylene terephthalate), nylon 6, nylon 66, polybutene, and thermotropic liquid crystal polymers. Examples of suitable thermotropic liquid crystal polymers include aromatic polyesters, which exhibit liquid crystal properties when melted, and which are synthesized from aromatic diols, aromatic carboxylic acids, hydroxycarboxylic acids, and other like monomers. Typical examples include a first type consisting of parahydroxybenzoic acid (PHB), terephthalic acid, and biphenol; a second type consisting of PHB and 2,6-hydroxynaphthoic acid; and a third type consisting of PHB, terephthalic acid, and ethylene glycol. Preferred polymers are polyolefins such as polypropylene and polyethylene that are readily available at low cost and can provide highly desirable properties in the embossed articles such as high modulus and high tensile strength.

The molecular weight of the polymer should be chosen so that the polymer is melt processible under the processing conditions. For polypropylene and polyethylene, for example, the molecular weight may be from about 5000 to 500,000 and is preferably from about 100,000 to 300,000.

The second polymer component is melt-processible and chosen so that the yield point of the second polymer component is less that the yield point of the semicrystalline polymer component. The yield point is that point at which the rate of flow equals the imposed strain rate. For polyethylene for example, the yield point is the stress at the stress maximum; at this point flow taking place instantaneously at the imposed strain rate, with the stress neither increasing or decreasing. Further discussion of yield points, and the yield points of common polymers, may be found in McCrum et al., *Principles of Polymer Engineering*, Oxford University Press, New York, 1988, pp. 167–72. Preferably the yield point of the second polymer component is at least 10% less than that of the semicrystalline polymer, more preferably 20% less. When referring to yield points of the first or second polymer, one references the yield point of the individual, unoriented polymers, rather than the yield point of a blend of the two polymers, or the yield points of the oriented polymers. Yield points may be determined by ASTM D638.

Polymers useful as the second polymer component include thermoplastic elastomers. Thermoplastic elastomers are defined and reviewed in *Thermoplastic Elastomers, A Comprehensive Review*, edited by N. R. Legge, G. Holden and H. E. Schroeder, Hanser Publishers, New York, 1987 and in Kirk-Othmer Encyclopedia of Chemical Technology, 4$^{th}$ Edition, vol 9, pp 15–37, Wiley-Interscience, N.Y., 1994. Thermoplastic elastomers (as defined by Legge et al. and used herein) are generally the reaction product of a low equivalent weight polyfunctional monomer and a high equivalent weight polyfunctional monomer, wherein the low equivalent weight polyfunctional monomer is capable on polymerization of forming hard a segment (and, in conjunction with other hard segments, crystalline hard regions or domains) and the high equivalent weight polyfunctional monomer is capable on polymerization of producing soft, flexible chains connecting the hard regions or domains.

"Thermoplastic elastomers" differ from "thermoplastics" and "elastomers" (a generic term for substances emulating natural rubber in that they stretch under tension, have a high tensile strength, retract rapidly, and substantially recover their original dimensions) in that thermoplastic elastomers, upon heating above the melting temperature of the hard regions, form a homogeneous melt which can be processed by thermoplastic techniques (unlike elastomers), such as injection molding, extrusion, blow molding, and the like. Subsequent cooling leads again to segregation of hard and soft regions resulting in a material having elastomeric properties, however, which does not occur with thermoplastics.

Commercially available thermoplastic elastomers include polyester thermoplastic elastomers, polyurethane thermoplastic elastomers, polyamide thermoplastic elastomers, blends of thermoplastic elastomers and thermoplastic polymers, and ionomeric thermoplastic elastomers.

Thermoplastic elastomeric materials useful in the present invention include, for example, linear, radial, star and tapered styrene-isoprene block copolymers such as KRATON™ D I 107P, available from Shell Chemical Co. and EUROPRENE™ SOL TE 9110, available from EniChem Elastomers Americas, Inc., linear styrene-(ethylene-butylene) block copolymers such as KRATON™ G1657, available from Shell Chen-dcal Co., linear styrene-(ethylene- propylene) block copolymers such as KRATON™ G165X, available from Shell Chemical Co., styrene-isoprene-styrene block copolymers such as KRATON™ D 1119P, available form Shell Chemical Co., linear, radial, and star styrene-butadiene block copolymers such as KRATON™ D 1118X, available from Shell Chemical Co., EUROPRENE™ SOL TE 6205, available from EniChem Elastomers Americas, Inc., polyetheresters such as HYTREL™ G3548, available from DuPont Co., and poly-α-olefin-based thermoplastic elastomeric materials and poly-α-olefins based on metallocene catalysis (known as metallocene polyolefins) such as ENGAGE™ EG8200, an ethylene/ 1 -octene copolymer available from Dow-DuPont Elastomers LLC are especially preferred. Other useful poly-α-olefins include those described in WO 99/20664 and references therein.

The blends of the first and second polymer components may be compatible or incompatible blends. When compatible, the second polymer may be chemically and/or mechanically compatible with the semicrystalline first polymer component, which permits effective blending during extrusion and minimizes gross phase separation with aging. Compatibility may be determined by differential scanning calorimetry (DSC) to measure the melting points and glass transition temperatures ($T_g$) of the polymer blend. If two glass transition temperatures are detected by DSC due to the constituent polymers in a blend, the blend is said to be incompatible. If a single glass transition temperature, intermediate between those of the constituent polymers, is detected, the blend is said to be compatible. Mechanically compatible blends represent a deviation from this generality, since they exhibit two glass transition temperatures, but have a finer morphology and are translucent. Preferably the blends forms an incompatible mixtures or "mechanically compatible" mixtures such that separate phases of the first and second polymer components form on cooling.

When using an incompatible polymer blend, the relative amounts of the first polymer component and second polymer component can be chosen so the first polymer component forms a continuous phase and the second polymer component forms a discontinuous phase, or each polymer forms a continuous phase, as in an interpenetrating polymer network. The relative amounts of the first and second polymer components can vary widely, from 100:1 to nearly 1:1 weight ratio. Preferably, the semicrystalline polymer component forms the continuous phase while the second polymer component forms a discontinuous, or discrete phase, dispersed within the continuous phase of the first polymer component. In such constructions, the amount of second polymer component can affect final film properties.

In general, as the amount of the second polymer component increases, the susceptibility to tearing increases and the tensile strength decreases in the final embossed film. As a result, properties that are affected by the amount of second polymer component, such as mechanical properties, density, etc., will depend upon the amount of added second polymer component. As the amount of second polymer in the blend is increased, a composition range will be reached at which the second polymer component can no longer be easily identified as the dispersed, or discrete, phase. Further increase in the amount of second polymer component in the blend will result in a phase inversion wherein the second polymer component becomes the continuous phase and the mechanical properties of the film are unduly compromised.

Preferably, the amount of the second polymer component in the composition is from 1% by weight to 49% by weight, more preferably from 5% by weight to 40% by weight, most preferably from 10% by weight to 30% by weight. In these composition ranges, the first semicrystalline polymer generally forms a continuous phase, while the second polymer component forms the discrete, discontinuous phase, and the film retains mechanical integrity.

The surface of the embossed article displays a pattern of elevated areas or relatively thick portions, separated by valleys, or relatively thin portions. The elevated areas take the form of ridges, mounds, peaks, cylinders or other embossments which may be uniform or varied in shape and dimensions and are generally disposed in a regular arrangement or pattern. It is important that the embossments be disposed so that they extend at an angle of 45° or more to the lateral edge of the film, thereby facilitating a continuous path of potential tearing along the valleys between embossments extending within an angle of 45° or less from perpendicular to the lateral edges of the film. It is preferred that the embossments be disposed so that they extend substantially transversly, i.e. about 90° from the lateral edge of the film. It is further preferred that any embossments have a length significantly greater than the width of the valley between embossments.

A wide variety of patterns meet the foregoing criteria, and films having such patterns can be successfully used as the backings for an adhesive tape which may be torn substantially transverse to the machine direction of the tape. If desired, an embossing pattern may be chosen to permit tearing in both the transverse and machine direction of the film. Typically there are about 5 to 20 embossments per lineal centimeter. The embossments can be of any suitable depth, as long as the mechanical properties of the films are substantially retained after the embossments have been formed. The depth of an embossment typically ranges from 10 to about 90 percent of the thickness of the oriented thermoplastic film. Preferably, the depth of an embossment typically ranges from 25 to 75 percent of the thickness of the oriented film.

The film of the present invention may be used as a tape backing and coated with an adhesive to produce an adhesive article. Many types of adhesives can be used. The adhesive can include hot melt-coated formulations, transfer-coated formulations, solvent-coated formulations, water-based, and latex formulations, as well as laminating, thermally-activated, and water-activated adhesives. These adhesives can be applied by conventional techniques, such as solvent coating by methods such as reverse roll, knife-over-roll, gravure, wire wound rod, floating knife or air knife, hot-melt coating such as; by slot orifice coaters, roll coaters or extrusion coaters, at appropriate coating weights.

Examples of adhesives useful in the invention include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, and solvents.

Useful adhesives according to the present invention can be pressure sensitive adhesives. Pressure sensitive adhesives are normally tacky at room temperature and can be adhered to a surface by application of, at most, light finger pressure. A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

Although the pressure-sensitive adhesive may be coated on a smooth face, or non-patterned surface of the film, there are certain advantages to coating the adhesive on a patterned face. For example, the exposed surface of the adhesive will then contact the smooth back side of the film when the tape is wound in roll form, thereby maintaining a nearly planar surface. Such a planar surface quickly establishes contact with an adherent or substrate surface and bonds firmly and quickly. When coating the patterned face of the film, the adhesive may completely or partially cover the embossments.

Conversely, when coated on a smooth or unpatterned face, the exposed surface of the adhesive will contact the patterned face of the film when the tape is wound in roll form, minimizing the contact area between the two surfaces, resulting in a lower unwind force. Coating the adhesive on the smooth face can often reduce or eliminate the need for a low adhesion backsize coating (LAB).

When a pressure sensitive adhesive is coated onto one side of the film, a release coating (a low adhesion backsize (LAB) coating) is optionally coated on the opposite face to allow the resultant tape to unwind from itself when wound in a roll or to release when in a pad form. When utilized, the release coating composition should be compatible with the adhesive composition and not degrade the adhesive properties of the tape, such as by being transferred to the adhesive composition.

Release coating compositions for the LAB layer of tapes may include silicone, alkyl, or fluorochemical constituents, or combinations as the release imparting component. Useful release coating compositions for the invention include silicone containing polymers, such as silicone polyurethanes, silicone polyureas and silicone polyurethane/ureas, such as those described in U.S. Pat. Nos. 5,214,119, 5,290,615, 5,750,630, and 5,356,706, and silicone acrylate grafted copolymers described in U.S. Pat. Nos. 5,032,460, 5,202, 190, and 4,728,571. Other useful release coating compositions include fluorochemical containing polymers such as those described in U.S. Pat. No. 3,318,852, and polymers containing long alkyl side chains such as polyvinyl N-alkyl carbamates (e.g., polyvinyl N-octadecyl carbamates) as described in U.S. Pat. No. 2,532,011, and copolymers containing higher alkyl acrylates (e.g., octadecyl acrylate or behenyl acrylate), such as those described in U.S. Pat. No. 2,607,711, or alkyl methacrylates (e.g., stearyl methacrylate) such as those described in U.S. Pat. Nos. 3,502,497 and 4,241,198, where the alkyl side chain includes from about 16 to 22 carbon atoms.

These release polymers can be blended with each other and with thermosetting resins or thermoplastic film forming polymers to form the release coating composition. In addition, other additives may be used in the release coating compositions such as fillers, pigments, wetting agents, viscosity modifiers, stabilizers, anti-oxidants, and cross-linking agents.

Numerous other layers can be added to the tape, such as primers to increase adhesive layer adhesion to the backing layer. Also, the release properties of the backing can be modified such that the backing and the adhesive cooperate to achieve desired unwind characteristics. The release properties of the backing can be modified by applying a low surface energy composition, priming, corona discharge, flame treatment, roughening, etching, and combinations.

FIG. 1 is a top view of an embossing die, useful in producing a film of the present invention, 10 bearing an embossment pattern of truncated pyramids, which define relatively thick ridges 12, thin areas 14 connected by regions of graduated thickness 16. The tape formed with this embossing pattern is easily torn in the transverse direction along the lines defined by relatively thin portions created by the thick ridges 12, and resists tearing along the direction of orientation due to the intervening ridges.

Figure 2A:
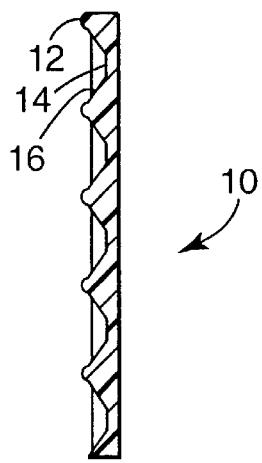

FIG. 2a is a cross-sectional view of FIG. 1, taken along line 2a—2a.

Figure 2B:
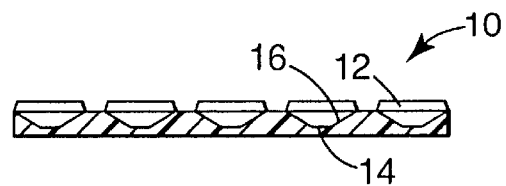

FIG. 2b is a cross-sectional view of FIG. 1, taken along line 2b—2b.

Figure 3:
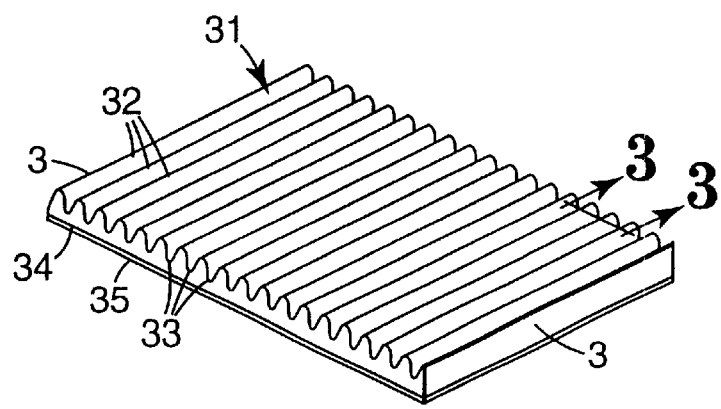

FIG. 3 is an enlarged perspective view of adhesive tape having textured face comprising cordlike ridges 32 and interposed valley portions 33. The smooth face 34 of the film is coated with an adhesive layer 35. The tape may be easily torn in the transverse direction, but resists tearing in the direction of orientation along line 3—3. Not all of the crests are necessarily the same height, but none of them is more than about 90% the calipered thickness of the film below the crests of the highest ridge. Again, if these limits are exceeded, the strength is lowered to an undesirable level. Similarly, the valleys are not of constant depth, but the thickness of the film between the bottom of each valley 33 and smooth face 34 is not more than about 90% the calipered thickness. If the thickness falls below this range, the film lacks the desired degree of tensile strength; if the thickness falls above this range, the foil is difficult to tear. While a marginally functional product can be made even if these limits are exceeded somewhat, the resultant product has reduced tensile strength parallel to the ridges and lowered tear resistance perpendicular to the ridges.

Figure 4:
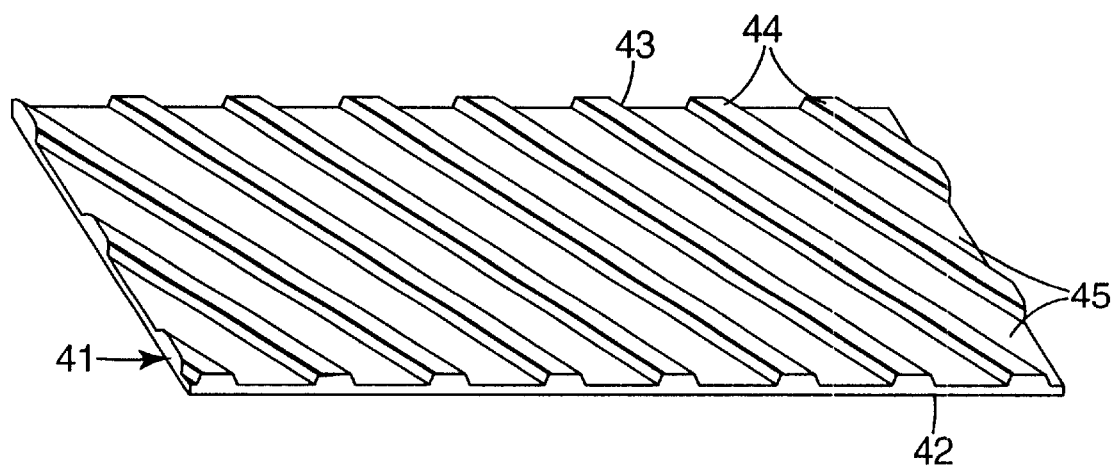

In FIG. 4, polymeric film backing 41 has smooth face 42 and textured face 43, comprising crested ridges 44 and interposed valley portions 45. The embossment pattern has been orient to promote tearing substantially transverse to the machine direction of the film at an angle of 45° or more to the lateral edge of the film.

Figure 5:
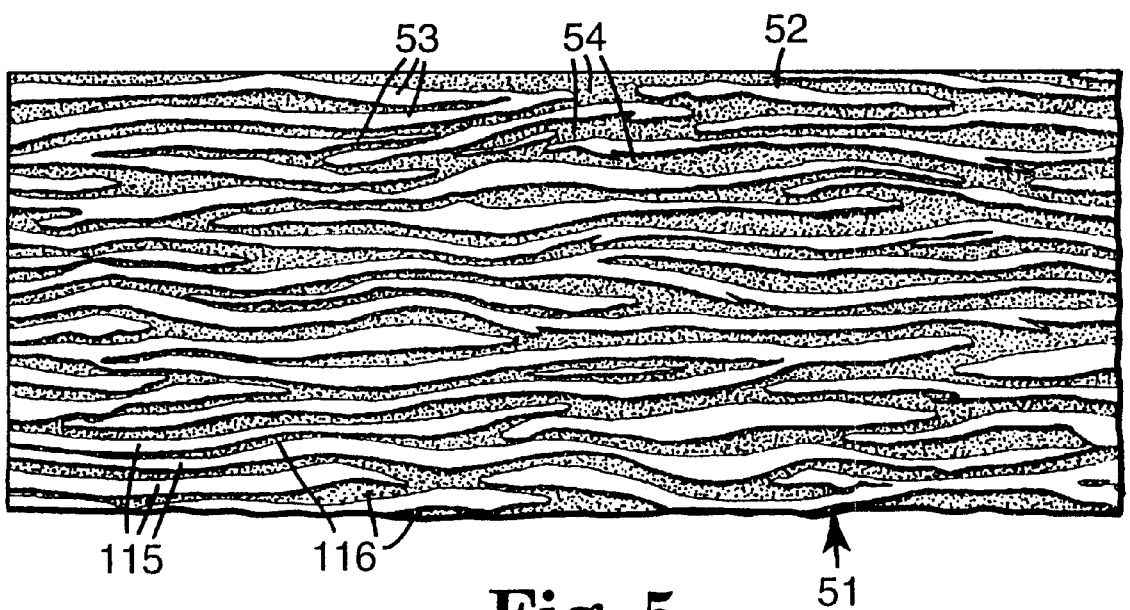

In FIG. 5, polymeric film 51 has one smooth face (not shown) and patterned face 52, comprising crested ridges 53 and interposed valley portions 54. The ridges are relatively random in size and distribution, but have a major axis perpendicular to the lateral edge of the film (and perpendicular to the direction of orientation), facilitating tear in a transverse direction.

Figure 6:
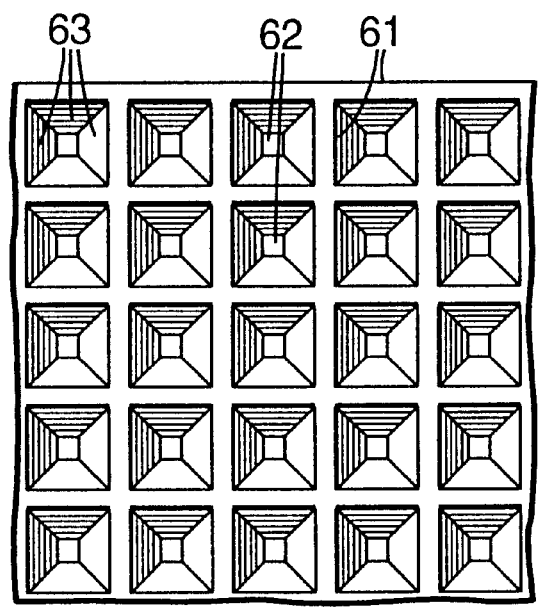

FIG. 6 is a top view of a film using an alternate embossed pattern, similar to that of FIG. 1. The pattern comprises a mesh-like pattern of relatively thin areas 61 surrounding truncated pyramids in relief, and areas of graduated thickness 63 between the two. Because the relatively thin portions are disposed both parallel and perpendicular to the lateral edge of the film, the film may be torn both transversely and in the machine direction.

The film of the present invention may be prepared by providing a film comprising a melt-processed mixture comprising a semicrystalline first polymer component and a second polymer component having a yield point less than the first polymer component, orienting the film, and embossing the oriented film with a pattern to impart tearability in a direction substantially transverse to the direction of orientation. Optionally a pattern may be chosen that will impart tearability in the longitudinal direction as well.

The melt solution is prepared by mixing the polymers in a continuous mixing device such as an extruder. The first and second polymers may be added simultaneously, or the second polymer may be added after the first semicrystalline polymer component is melted. Once the melt solution is mixed sufficiently, it is shaped in a form of a film or a sheet by extrusion through a flat sheet or film die.

Cooling of the shaped article occurs by contacting the film (or sheet) with a casting wheel, a water bath, or with air. Where the polymer mixture is incompatible, cooling causes phase separation to occur between the polymer components, generally by crystallization precipitation of the first polymer component to form a network of polymer domains. It will be understood that by this method the rate of crystallization must be sufficient to achieve the overall desired number of crystal sites. The crystallization rate is impacted by known processing conditions, and in those cases where the rate of crystallization is excessively slow additional factors must be considered, such as increased heat transfer (i.e., faster quench rate) and/or the addition of nucleating agents. In general, it is desirable to maximize the crystallinity of the first polymer component, using known polymer processing techniques such as calendering.

Uniaxially oriented polymer films are prepared by methods known in the art, such as heating the polymer blend film (comprising the first and second polymer components) to a temperature near or above the softening transition temperature, followed by stretching in one or more directions. Typically, a polymer sheet is extruded (also referred to as "melt extruded") and then oriented by rapid stretching at a desired temperature to form an oriented film, followed by quenching. Quenching ensures that the orientation is not lost by molecular relaxation. Orientation can occur in the direction of film motion, referred to in the art as the machine direction or the longitudinal direction. Alternatively, films may be uniaxially oriented in the transverse direction; orthogonal to the machine direction by means of a center frame. Mechanical properties of oriented films vary depending upon the direction and degree of orientation and often referenced to the longitudinal and transverse directions. Orientation typically produces stiffer films with increased modulus, decreased elongation-at-break and increased tensile strength-at-break. However, such increases in the mechanical properties, such as stiffness, have heretofore produced films that are not hand-tearable.

The conditions for orientation are chosen such that the integrity of the film is maintained. Thus, when stretching, the temperature is chosen such that substantial tearing or fragmentation of the major component is avoided. The film is particularly vulnerable to tearing or even catastrophic failure if the temperature is too low or the orientation ratio is too high. Preferably the orientation temperature is above the glass transition temperature (but below the melting temperature) of the major component. Such conditions permit maximum uniaxial orientation without loss of film integrity. It is preferred to stretch the film at least 3:1, preferably at least 6:1 and most preferably at least 8:1. It is further preferred that the first polymer component provides a continuous phase of the polymer matrix and the second polymer component produces a discontinuous phase.

Where higher draw ratios, and strength and stiffness are desired, the uniaxially oriented films may be calendered after quenching, prior to stretching. Calendering allows higher molecular orientation to be achieved by enabling subsequent higher draw ratios. Calendering at the appropriate temperature can reduce the average crystallite size through shearing and cleaving of the polymer entanglements and may impose an aspect ratio on the polymer spherulites (i.e. flatten in the direction normal to the plane of the film and elongate in the machine direction).

Calendering is preferably performed at or above the alpha crystallization temperature. This temperature, $T_{ac}$, corresponds to the temperature at which crystallite subunits are capable of being moved within the larger lamellar crystal unit. Above this temperature lamellar slip can occur, and extended chain crystal form, with the effect that the degree of crystallinity is increased as the amorphous regions of the polymer are drawn into the lamellar crystal structure. The calendering step has the effect of orienting the fibrils into the plane of the film from the original radially oriented sphere.

The final thickness of the oriented polymer films will be determined in part by the casting thickness, the degree of orientation and any additional processing such as calendering. For most uses the final thickness of the film, prior to embossing, will be 1 to 20 mils (0.025 to 0.5 mm), preferably 3 to 10 mils (0.075 to 0.25 mm).

The oriented polymer films useful in this invention may contain fillers, plasticizers, colorants, lubricants, processing aids, nucleating agents, ultraviolet-light stabilizing agents, and other property modifiers. Typically such materials are added to a polymer before it is made into an oriented film (e.g., in the polymer melt before extrusion into a film). Organic fillers may include organic dyes and resins, as well as organic fibers such as nylon and polyimide fibers. Inorganic fillers may include pigments, fumed silica, calcium carbonate, talc, diatomaceous earth, titanium dioxide, carbon fibers, carbon black, glass beads, glass bubbles, mineral fibers, clay particles, metal particles and the like. Fillers may be added in amounts up to about 100 parts per 100 parts of the polymer blend forming the oriented film, as long as the mechanical properties of the film, such as tear and tensile strength, are not unduly compromised. Other additives such as flame retardants, stabilizers, antioxidants, compatibilizers, antimicrobial agents (e.g., zinc oxide), electrical conductors, and thermal conductors (e.g., aluminum oxide, boron nitride, aluminum nitride, and nickel particles) can be blended into the polymer used to form the film in amounts of from about 1 to about 50 volume percent.

Embossing refers to a process in which a pattern is impressed into the surface of an article. Embossing is typically accomplished by means of a male pattern formed on a hard material such as a metal layer on an embossing roll. Those skilled in the art recognize that embossing can be done by several methods, including the use of a continuous tooled belt or sleeve. Preferred metal layers include those comprising nickel, copper, steel, and stainless steel. Patterns are typically acid etched or machined into the metal layer and can have a wide variety of sizes and shapes. Any pattern that can be scribed into a metal surface can be used in the practice of this invention. One useful embossing method is described in Assignee's copending U.S. application Ser. No. 08/942,062, incorporated herein by reference.

"Pattern" does not necessarily refer to a regular repeating array, but may mean a random array of features having the same or different sizes, as long as the embossed pattern promotes tearability in a substantially transverse direction. Patterns suitable for the practice of this invention include four-sided square pyramids, truncated four-sided square pyramids, cones, straight lines, wavy lines, square or rectangular blocks, hemispheres and the like and are imparted to at least a portion of the embossing roll. An individual feature of the pattern is referred to as an embossment. The number and spacing of embossments, as well as the nature of the individual embossment, such as its depth, degree of sharp reflecting edges, and shape can be varied as desired to promote tearability in a substantially transverse direction, and optionally in the longitudinal direction as well. For example, an embossing pattern of substantially transverse lines or ridges will promote controlled transverse tear and retard longitudinal tear, while a repeating pattern of pyramids, having valleys or relatively thin portions, can promote controlled tearing in both the transverse and longitudinal directions. If desired the pattern may be offset to promote tearing at a predetermined angle; such as 45° from the lateral edge of the film. It will be understood that any pattern chosen may be in relief or in recess relative to the plane of the film.

As exemplified below, a plurality of embossments are formed on the oriented film. There are typically about 5 to 20 embossments per lineal centimeter. The embossments can be of any suitable depth, as long as the mechanical properties of the films are sufficient for the desired end use after the embossments have been formed. The depth of an embossment typically ranges from 10 to about 90 percent of the thickness of the oriented thermoplastic film. Preferably, the depth of an embossment typically ranges from 25 to 75 percent of the thickness of the oriented film. Preferably the pattern is transversely discontinuous—i.e. not continuous in the direction perpendicular to the direction of orientation. It has been found that discontinuous patterns, having regions of unembossed film, better maintain the tensile strength of the film in the longitudinal direction. One example of a discontinuous pattern is shown in FIGS. 1, 2a and 2b.

In the method of this invention, an oriented thermoplastic film having a first and second major surface is provided. The thermoplastic film moves between or over rollers or the like that serve to control the film tension. At least one of the first and second major surfaces of the film is exposed to a heat flux from a heat source such as a flame, a plasma torch, and the like. Heat sources result in a softened surface in the desired time frame, that is, rapidly enough to cause softening of the film surface without causing a significant change in the orientation and/or properties of the bulk film. The film may move over a support, such as a backing roll, while being exposed to the source of heat. A support for the film can minimize distortion of the film during heating. The heat source provides sufficient heat to the surface of the oriented thermoplastic film to soften the surface as necessary for embossing.

Embossing can be carried out by any means known in the art. The preferred method of embossing is to move the softened film through a nip having an embossing surface. "Nip" refers to two rolls in proximity that apply pressure on a film when the film passes between them. The embossing surface contacts the film with sufficient force to create embossments in the softened surface of the film. The embossed film is then cooled by any of a number of methods to reduce the temperature of the softened surface to below its softening temperature before the softened film has experienced a significant change in bulk properties resulting from prior orientation. Such methods include moving the film over one or more chilled rollers, delivering it to a water bath, or cooling by air or other gases, such as by use of an air knife.

In this application, "dwell time" is defined as the time it takes for the combined steps of softening, embossing, and cooling the film. Dwell time will vary depending upon the configuration (e.g., equipment size and film speed) of the system used to heat, emboss, and cool the film. The time of exposure to heat should be sufficient to soften the surface of the oriented thermoplastic film prior to contact with the embossing roll and the dwell time should not be so long as to cause destruction of the mechanical properties of the film. Thus, in preferred embodiments, the dwell time is as short as possible.

After the film has been oriented and embossed it may be further processed. For example, the film may be annealed or heat set by subjecting the film to a temperature sufficient to further crystallize the semicrystalline polymer component while restraining the film against retraction in the direction of orientation. Similarly, use may be made of adhesion promoting corona discharge (corona treating). Such surface treatment permit the stronger adhesion of an applied coating, such as adhesives or low adhesion backsizings, but does not adversely affect the bulk mechanical properties of the film.

This invention is further illustrated by the following examples that should not be construed to unduly limit the invention.

TEAR TEST

To test tear in the machine direction (MD) or transverse direction (TD), a specimen approximately 75 mm long and 25 mm minimum width is positioned in a vertical plane with the long dimension extending horizontally, with one of the specimen gripped between a pair of movable jaws of an Instron test machine, horizontally spaced 2.5 mm. A small slit was made in the edge of the test specimen extending in the machine or transverse direction, depending on the direction of tear force of interest, between jaws. The jaws are separated, perpendicular to the plane of the test specimen, at a rate of 1 inch/minute or 50 inches/minute (2.5 cm/min or 127 cm/min) and the force required to propagate a tear is recorded.

EXAMPLE 1

An 80:20 w/w blend of polypropylene (FINA™ 3374X, Fina, Inc., Dallas, Tex.) and a metallocene elastomeric polyolefin (ENGAGE™ 8180, Dupont Dow Elastomers LLC, Wilmington, Del.) was mixed in a single-screw extruder having a temperature profile of 229°C.–239°–247° C.–246° C. (feed to tip) at 50 rpm. A single-slot die at 246° C. was used to extrude a 1.6 mm thick film onto a casting wheel kept at 90° C. The cast film was fed directly into a length orienter (Bruckner Maschinenbau GmbH, Siegsdorf, Germany) comprising six 15 cm diameter rolls preheated at 95° C. such that each side of the film came in contact with three rolls. Input speed was 1 m/min. After exiting the preheat rolls, the film was stretched to a draw ratio of 6:1 between two 7.3 cm diameter rolls heated at 95° C. The film was then led into an elongated oven heated to 130° C. where it was further stretched at a ratio of 1.25:1, then stretched between the rolls of a tensilizer at a draw ratio of 2:1. The oriented film was cooled to 23° C. over a series of unheated rolls, then wound onto a take-up reel. The overall draw ratio for all operations was 15:1. Final film caliper was 0.15 mm.

The oriented film was embossed between two rolls heated at 118° C. and a pressure of 2.1 MPa, at 3.1 m/min. The calender station was set-up with a 25.4-cm diameter×55.9-cm wide smooth steel roll in the lower position and a 25.4-cm diameter×55.9-cm wide steel roll with an engraved pattern in the upper position, the pattern consisting of rectangular, brick-like elements 0.91 mm (cross direction)× 0.20 mm (machine direction)×0.23 mm high, a 1.27 repeat distance in the machine and transverse directions, having a bond area of 11.5% (available as pattern I 9418 from Industrial Engraving and Manufacturing Co., Pulaski, Wis.). Embossing increased the nominal film thickness from 0.15 mm to 0.30 mm.

The embossed film of this example was subjected to the tear test at a jaw speed of 2.5 cn/minute. The tear values in the machine direction were 2.14 N and in the transverse direction were 1.16 N. Similarly at 127 cm/minute jaw speed the values were 1.24 and 0.85N respectively.

The non-embossed side of the film was treated under a corona discharge of 70) Watts at a line speed of 0.23 m/sec to prepare the surface for an adhesive coating. A water-based acrylic adhesive (R9319™, Union Carbide Corp., Danbury, Conn.) was knife-coated onto the non-embossed side of the film at 0.05 m/sec with a coating weight of 62.8 g/m$^2$. The adhesive coating was air dried at 66° C. to prepare an adhesive tape construction.

EXAMPLE 2

A 75:25 w/w blend of polypropylene (FINA™ 3271, Fina Inc.) and thermoplastic polyolefin (ENGAGE™ 8180, Dow DuPont Elastomers LLC) containing 2% by weight: of Reed Spectrum Gray pigment (Reed Plastics Corp., Holden, Mass.) was prepared by dry mixing the pigment and ENGAGETM polyolefin which was fed into a single-screw extruder operating at 46 rpm, along with the polypropylene. The temperature profile of the extruder (feed to tip) was 199° C.–216° C.–238° C.–238° C.–238° C.–238° C.–260° C., and the casting wheel, operating at 2 m/min, was heated to 82° C. The resulting blend was extruded at a rate so as to produce film that was approximately 1.63 mm thick.

The resulting film was length oriented using a series of heated rollers comprising a preheat zone, a first fast-draw zone and a second fast-draw zone, as described in U.S. Pat. No. 5,079,066, Example 1 and FIG. 3, which is incorporated herein by reference. In the present example, the rollers of all zones were held at 149° C., and the drawn film was cooled on a cooling roll at 82° C. Draw ratio in the first fast-draw zone was 6:1, and in the second fast-draw zone, 1.5:1, resulting in an overall draw ratio of 9:1 for the film.

The oriented films were embossed using the embossing tool described in Example 1. Calendar temperature was 138° C. for both rolls, calendar speed was 1.5 m/min, under pressure of 2.7 Mpa. Embossing increased the nominal film thickness to approximately 0.34 mm Tensile properties of the embossed films were measured using a Model 1122 tensile testing machine (Instron Corp., Park Ridge, Ill.) equipped with a Model 2511–317 500 N load cell at 23° C. The instrument gage gap was 5.1 cm and the cross head speed was 30.5 cm/min. Results are shown in Table 1. In Table 1 "MD" refers to the machine direction or the direction of orientation, "TD" refers to the transverse direction. For comparative purposes, samples of duct tape (available as Highland 6969™ from the 3M company) was also tested.

TABLE 1

|  | Tensile Modulus, MPa | Tensile Strength, MPa | Elongation % | Energy to Break, joules | Max. Load, Newtons | Tear test 2.5 cm/min Newtons | Tear test 127 cm/min Newtons |
|---|---|---|---|---|---|---|---|
| 9:1 Draw | | | | | | | |
| No pattern MD (Comp) | 2321 | 162 | 11 | 2.7 | 911.9 | 0.31 | |
| No Pattern TD (Comp) | 420 | 19.3 | 670 | 27.9 | 106.7 | 2.44 | |
| Embossed sample-MD | 662 | 46 | 9 | 0.9 | 427 | 1.11 | 1.02 |
| Embossed sample-TD | 209 | 10 | 46 | 2.0 | 98 | 1.91 | 1.91 |
| 7:1 Draw | | | | | | | |
| No pattern MD (Comp) | 2218 | 148 | 10 | 2.2 | 823 | | |
| No Pattern TD (Comp) | 343 | 20 | 720 | 27.1 | 98 | | |
| Embossed sample-MD | 972 | 50 | 7 | 0.7 | 445 | | |
| Embossed sample-TD | 193 | 9 | 50 | 1.8 | 80 | | |
| Duct tape MD | | | | | | 19.75 | |
| Duct tape TD | | | | | | 21.75 | |

The data of Table 1 show that, although embossing causes a decrease in load-bearing capacity of the film, that capacity remains sufficiently high so as to produce an acceptable film tape backing. This is because the load-bearing capacity (Maximum Load, in Table 1) was extremely high prior to embossing, due to film orientation. Maximum load in the cross-web direction is unchanged by embossing, since the orienting process does not impart additional strength in the cross-web direction. Values shown for Tensile Modulus and Tensile Strength are decreased for the embossed films because the calculations used to obtain these values used the nominal cross sectional area of the film instead of the effective load bearing cross sectional area present after embossing.

The data of Table 1 also show that much less force was required to tear the embossed film of the present invention in either the transverse or the machine direction than was required for the commercial duct tape. The unembossed films of the comparative examples do not tear straight or smoothly in the transverse direction, generally tearing about 20° from perpendicular. Comparison of MD and TD values for the embossed films of the invention shows that embossing controlled or reduced the tendency of the film to split in the machine direction and facilitated tear in the transverse direction. It was also noted that tear in both directions was straight and smooth, unlike the unembossed films.

To prepare an adhesive tape, the embossed film was corona-treated on the smooth (non-embossed) side at 700 Watts and a line speed of 0.23 n/sec. The corona-treated side was coated with a low-adhesion backsize (LAB) prepared as described in any of the U.S. Pat. Nos. 5,512,650, 5,214,119, and 5,290,615, the teachings of which are incorporated herein by reference, by roto-gravure roll coating (200 QCH roll Consolidated Engravers Corp., Charlotte, N.C.) at 0.23 m/sec. Solvent was then removed at 65° C. in an oven. The non corona treated, embossed side of the film was coated with a hot melt adhesive using a rotary rod die at a coating weight of 125 g/m².

The adhesive used to coat the film was prepared by mixing SI star block copolymer, tackifier, plasticizer, antioxidant, and white pigment in an extruder and extruding it onto the embossed side of the film.

What is claimed is:

1. An embossed, uniaxially oriented film comprising a polymer blend of:
    a major amount of a semi-crystalline first polymer component, and
    a minor amount of a second polymer component having a yield point less than that of the first polymer component, and
    an embossed pattern providing predetermined tearability in a direction substantially transverse to the direction of orientation.

2. The film of claim 1 further comprising a layer of pressure sensitive adhesive.

3. The film of claim 1 comprising an incompatible polymer blend of a continuous phase of a semi-crystalline first polymer component, and a discontinuous phase of a second polymer component.

4. The film of claim 1 wherein said first polymer component is selected from high and low density polyethylene, polypropylene, polyoxymethylene, poly(vinylidine fluoride), poly(methyl pentene), poly(ethylene-chlorotrifluoroethylene), poly(vinyl fluoride), poly(ethylene oxide), poly(ethylene terephthalate), poly(butylene terephthalate), nylon 6, nylon 66, polybutene, and thermotropic liquid crystal polymers.

5. The film of claim 1 wherein said second polymer is a thermoplastic elastomer.

6. The film of claim 1 wherein said second polymer is a metallocene polyolefin.

7. The film of claim 1 comprising 1 to 49 weight % of said second polymer component.

8. The film of claim 1 wherein said second polymer component has a yield point of at least 10% less than that of said first polymer component.

9. The film of claim 1 having a degree of orientation of at least 3:1.

10. The film of claim 1 having a degree of orientation of at least 10:1.

11. The film of claim 5 wherein said thermoplastic elastomer is selected from polyester thermoplastic elastomers, polyurethane thermoplastic elastomers, polyamide thermoplastic elastomers, blends of thermoplastic elastomers and thermoplastic polymers, and ionomeric thermoplastic elastomers.

12. The film of claim 5 wherein said thermoplastic elastomer is a metallocene polyolefin.

13. The film of claim 1 wherein the embossed pattern is a non-random pattern selected from pyramids, cones, straight lines, wavy lines, hemispheres and blocks.

14. The film of claim 1 wherein the embossed pattern is disposed so as to extend at an angle of 45° or more to the lateral edge of the film.

15. The film of claim 14 wherein the embossed pattern comprises 5 to 20 embossments per linear centimeter.

16. The film of claim 14 wherein the embossments are 10 to 90 percent of the thickness of the oriented film.

17. The film of claim 1 wherein the embossed pattern is transversely discontinuous.

18. A process for preparing an embossed, oriented film that comprises: providing a film comprising a melt-processed mixture comprising a semicrystalline first polymer component and a second polymer component having a yield point less than the first polymer component, orienting said film, and embossing at least one major surface of the oriented film with a predetermined pattern to impart tearability in a direction substantially transverse to the direction of orientation.

19. The process of claim 18 wherein said film is calendered prior to orientation.

20. The process of claim 18 wherein said film is oriented at least 3:1.

21. The process of claim 18 further comprising the step of annealing the embossed film.

22. The process of claim 18 further comprising the step of coating the film with a pressure sensitive adhesive.

23. The process of claim 22 wherein said adhesive is a pressure sensitive adhesive.

24. The process of claim 22 wherein said adhesive is coated on the embossed surface of the film.

25. The process of claim 22 wherein said adhesive is coated on the unembossed surface of the film.

26. The process of claim 18 further comprising the step of corona treating the embossed film.

27. The process of claim 18 wherein said second polymer is a thermoplastic elastomer.

28. The process of claim 27 wherein said thermoplastic elastomer is selected from polyester thermoplastic elastomers, polyurethane thermoplastic elastomers, polyamide thermoplastic elastomers, blends of thermoplastic elastomers and thermoplastic polymers, metallocene polyolefins and ionomeric thermoplastic elastomers.

29. The process of claim 18 wherein said film comprises an incompatible polymer blend of a continuous phase of a semi-crystalline first polymer component, and a discontinuous phase of a second polymer component.

30. The process of claim 18 wherein the predetermined embossing pattern is transversely discontinuous.

31. The film of claim 1 wherein said an embossed pattern provides predetermined tearability in a direction substantially perpendicular to the direction of orientation.

32. The film of claim 1 wherein said embossed pattern provides tearability at an angle of 45° or more from the lateral edge of the film.

* * * * *

UNITED STATES PATENT AND TRADEMARK OFFICE
CERTIFICATE OF CORRECTION

PATENT NO.  : 6,432,527 B1
DATED       : August 13, 2002
INVENTOR(S) : Perez, Mario A.

It is certified that error appears in the above-identified patent and that said Letters Patent is hereby corrected as shown below:

Column 2,
Line 26, following "thereof" insert -- . --.

Column 3,
Line 65, delete "G165X" and insert in place thereof -- G1657X --.

Column 12,
Line 16, delete "cn/minute" and insert in place thereof -- cm/minute --.
Line 21, delete "70" and insert in place thereof -- 700 --.
Line 32, delete "weight:" and insert in place thereof -- weight --.
Line 35, delete "ENGAGETM" and insert in place thereof -- ENGAGE$^{TM}$ --.

Column 13,
Line 65, delete "n/sec." and insert in place thereof -- m/sec. --.

Signed and Sealed this

Twenty-eighth Day of December, 2004

JON W. DUDAS
*Director of the United States Patent and Trademark Office*